(12) United States Patent
Lundstedt

(10) Patent No.: US 7,150,079 B2
(45) Date of Patent: Dec. 19, 2006

(54) CORD ADJUSTER

(75) Inventor: Kurt Lundstedt, Hawthorn Woods, IL (US)

(73) Assignee: Illinois Tool Works Inc, Glenview, IL (US)

( * ) Notice: Subject to any disclaimer, the term of this patent is extended or adjusted under 35 U.S.C. 154(b) by 65 days.

(21) Appl. No.: 11/080,530

(22) Filed: Mar. 15, 2005

(65) Prior Publication Data

US 2006/0000063 A1   Jan. 5, 2006

Related U.S. Application Data

(60) Provisional application No. 60/584,875, filed on Jul. 1, 2004.

(51) Int. Cl.
*A44B 21/00* (2006.01)

(52) U.S. Cl. .................... 24/129 R; 24/169; 24/198; 24/265 BC

(58) Field of Classification Search ............. 24/198, 24/265 BC, 169, 910
See application file for complete search history.

(56) References Cited

U.S. PATENT DOCUMENTS

| | | | | | |
|---|---|---|---|---|---|
| 634,014 | A | * | 10/1899 | Molloy | ............... 24/198 |
| 912,387 | A | | 2/1909 | Landry | |
| 3,707,022 | A | | 12/1972 | Diehl | |
| 4,171,555 | A | * | 10/1979 | Bakker et al. | ........... 24/200 |
| 4,571,783 | A | * | 2/1986 | Kasai | ................ 24/200 |
| 4,637,099 | A | * | 1/1987 | Kasai | ................ 24/200 |
| 4,903,378 | A | * | 2/1990 | Kasai | ................ 24/196 |
| 5,307,542 | A | * | 5/1994 | Murai | ................ 24/200 |
| D376,771 | S | | 12/1996 | Cheng | |
| D380,983 | S | | 7/1997 | Lu | |
| 5,651,166 | A | * | 7/1997 | Lundstedt | ............ 24/200 |
| 6,401,310 | B1 | | 6/2002 | Warner et al. | |

FOREIGN PATENT DOCUMENTS

DE   2213695   10/1972
GB   1125774   8/1968

* cited by examiner

*Primary Examiner*—Robert J. Sandy
(74) *Attorney, Agent, or Firm*—Mark W. Croll; Paul F. Donovan

(57) ABSTRACT

An adjuster for a cord includes a first end and a second end and the adjuster can be translated between a first and a second position. The first end can be attached to a looped member such as a belt and the looped member can be attached to a support surface. The adjuster includes a tortuous path configured to accept the cord. When the cord is inserted, the tortuous path divides the cord into a first portion and a second portion. When tension is applied to the second portion of the cord, the resultant friction forces exceed the tension force such that the position of the cord in the adjuster is maintained while the adjuster is in the first position. A force exerted on the second end of the adjuster can translate the adjuster to the second position where the friction force exerted by the tortuous path is substantially reduced such that the cord can be repositioned be exerting tension on either the first or the second portion of the cord. When the adjuster is returned to the first position, the application of tension to the second portion of the cord will again cause the adjuster to maintain the position of the cord.

18 Claims, 8 Drawing Sheets

CORD ADJUSTER

CROSS REFERENCE TO RELATED APPLICATION

This Non-Provisional Application claims benefit to U.S. Provisional Application Ser. No. 60/584,875 filed Jul. 1, 2004.

FIELD OF THE INVENTION

The present invention relates generally to an adjuster and more particularly to a cord adjuster configured to adjust the position of a cord with respect to the adjuster.

BACKGROUND OF THE INVENTION

The use of an adjuster is known in the art. Prior art adjusters are configured to work with a belt so as to adjust the position of the belt with respect to the adjuster and to hold the belt in position after it has been adjusted. Typically, such an adjuster is securely fastened on one end and includes a tortuous path configured to allow a belt to travel through the tortuous path. The belt is inserted through the tortuous path such that there is a first and second portion of the belt extending from the adjuster, each on opposite sides of the tortuous path. By pulling on the first portion, additional lengths of the belt can be pulled through the adjuster such that the length of the first portion is increased. Once a sufficient length of belt has been pulled through the adjuster, the second portion of the belt can be placed under tension. In many cases, due to the design of the tortuous path, when tension is exerted on the second portion, the resultant friction force created by the tortuous path is greater than the tension force such that the belt is prevented from being pulled through the adjuster, thereby holding the belt in place.

While prior art adjuster have been effective with belts, they have been unsuitable for use with cords. As there are certain situations where the use of a cord would be preferable to a belt, an improved adjuster is needed. Furthermore, current adjusters used with belts tend to be overly complicated. It would be useful to provide a simple adjuster suitable for use with a cord that can be inexpensively manufactured. The present invention is directed at solving these and other known drawbacks with existing adjusters while providing an adjuster suitable for use with a cord.

SUMMARY OF THE INVENTION

The present invention is directed to an improved adjuster suitable for use with a cord. In an embodiment, the adjuster has a first end that can be securely attached to a support surface. The adjuster includes a tortuous path. A cord can be inserted through the tortuous path so that a first end and a second end of the cord extend from the tortuous path. When tension is applied to the second end of the cord, the design of the tortuous path creates a resultant friction force greater than the tension force. Thus, a length of cord can be inserted into a tortuous path of the adjuster and once the second end is under tension, the position of the cord relative to the adjuster can be maintained. To reposition the cord, the adjuster can be translated from a first position to a second position so that the friction forces due to the tortuous path are substantially reduced. The cord can then be pulled through the tortuous path by applying tension to either the first or the second end of the cord.

Other features and advantages of the invention will become apparent to those skilled in the art upon review of the following detailed description, claims and drawings in which like numerals are used to designate like features.

Figure 1:
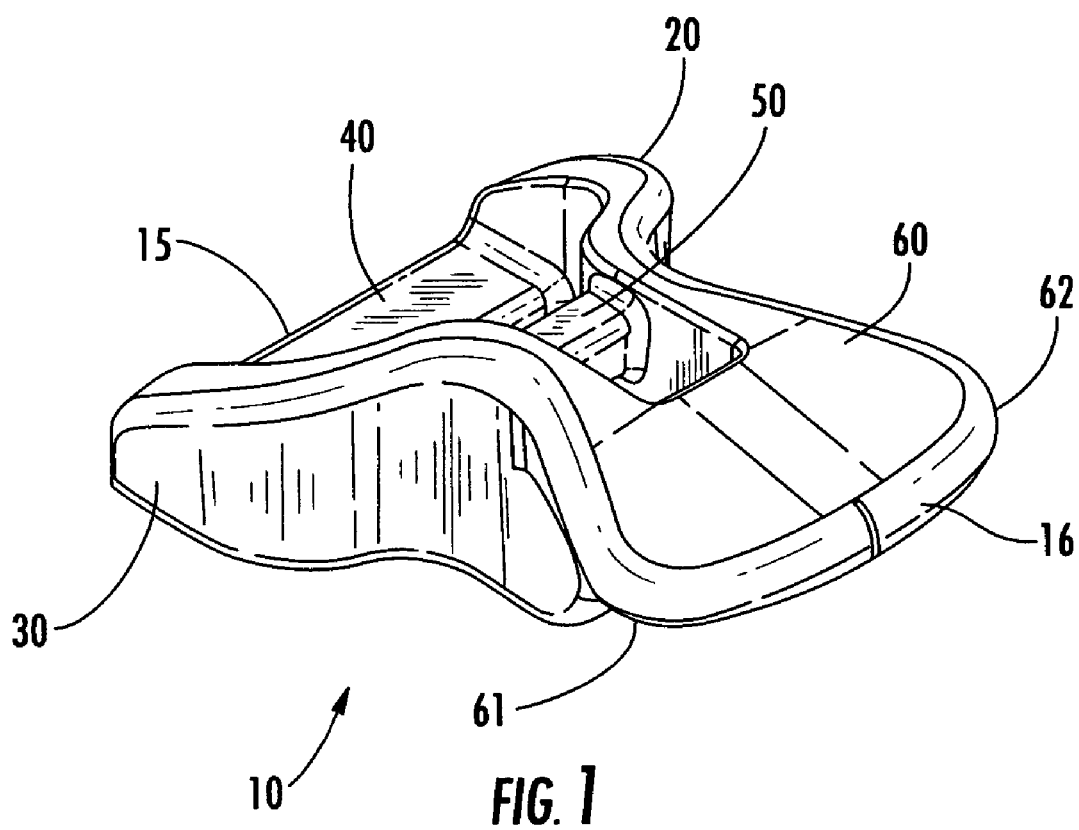
FIG. 1 is an isometric view of an exemplary embodiment of an adjuster.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to FIG. 1, an isometric view of an exemplary embodiment of an adjuster 10 is depicted. The adjuster 10 includes a first end 15 and a second end 16. The adjuster 10 further includes a first wall 20 and a second wall 30. Mounted between the first wall 20 and the second wall 30 is a first bar 40. The first bar 40 is located near the first end 15 of the adjuster 10 and is useful for providing an attachment point for a looping member such as a belt, cord, or the like. Other means of holding are also possible. For example, the first bar 40 can be configured in a known manner so as to be constrained by some other retaining feature such as a hook or a latch. If the first bar 40 is to be constrained by a cord, it is preferable that the length of the first bar 40 is fairly close to the diameter of the cord or that the first bar 40 be curved so that forces exerted on the first bar 40 do not introduce undesirable moment forces on the adjuster 10. In other applications, if a round or similarly shaped cord is desired for use, bar 40 may be replaced with two holes, one in wall 20 and one in wall 30, such that the cord extends left to right through the holes.

A second bar 50 is also mounted between the first wall 20 and the second wall 30. As depicted, the second bar 50 is shorter than first bar 40. This allows the first wall 20 to be located closer to the second wall 30. In an embodiment, the space between the first wall 20 and the second wall 30 approximate the second bar 50 is similar to the diameter of the cord that is to be adjusted by the adjuster 10. Such an arrangement aids in ensuring the proper orientation of the cord when inserted into the adjuster 10.

Continuing with FIG. 1, a tab 60 extends from the first and second walls 20, 30 to the second end 16 of the adjuster 10. A rear wall (not visible but shown as element 85 in FIG. 5) connects the first wall 20 to the second wall 30. Thus, tab 60 extends from the rear wall to the second end 16. The tab 60 provides a means for translating the adjuster 10 in a manner that will be more fully described below. As illustrated, the tab 60 includes rounded corners 61 and 62. While not required, the rounded corners 61, 62 help to make the adjuster 10 more ergonomic to the user so that the tab 60 is less likely to cause abrasions to materials or individuals that come into contact with the tab 60.

Figure 2:
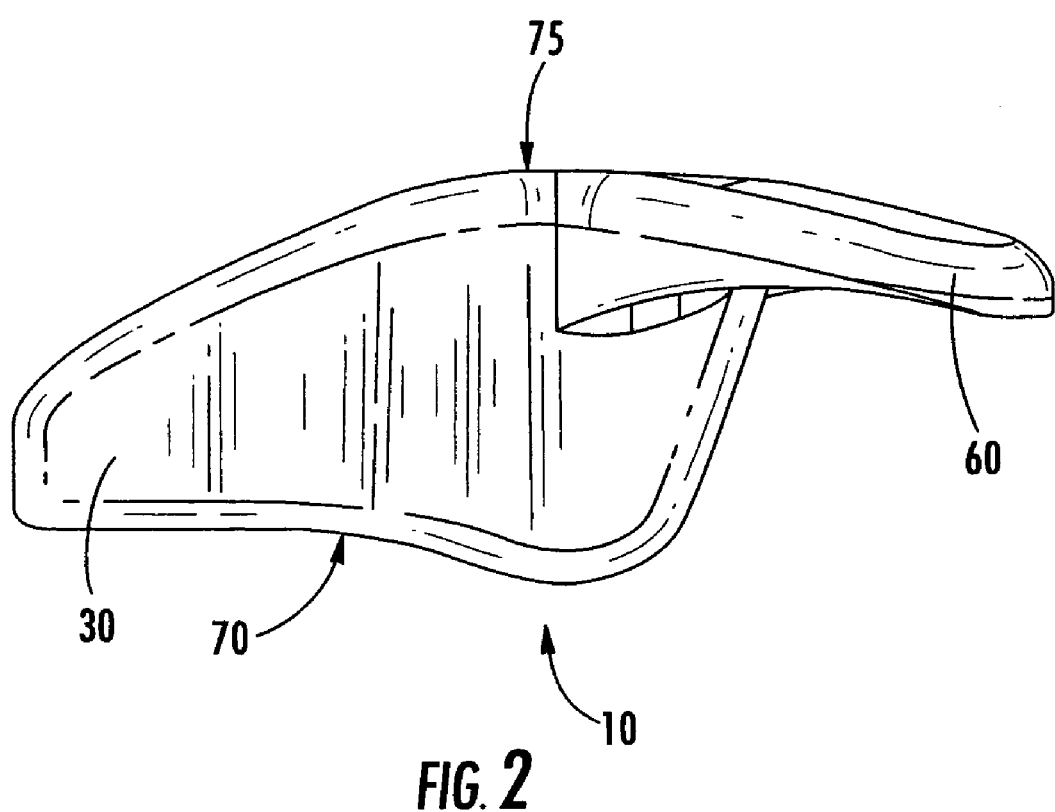
FIG. 2 is a side view of the adjuster depicted in FIG. 1.

FIG. 2 illustrates a side view of the adjuster depicted in FIG. 1. The adjuster 10 includes a bottom side 70 and a top side 75. As depicted, the bottom side 70 and the top side 75 are curved. The curvature of the top side 75 reduces potential abrasions that might otherwise be caused by rubbing against the top side 75. The curvature of the bottom side 70 can be beneficial in improving the interface between the adjuster 10 and the surface of the object being restrained. Of course, the adjuster 10 can also work in situations where the bottom surface 70 of the adjuster 10 is not resting against an object. In such a situation, the curvature of the bottom side 70 helps prevent undesirable abrasions that might otherwise be caused by contact with the adjuster 10.

Figure 3:
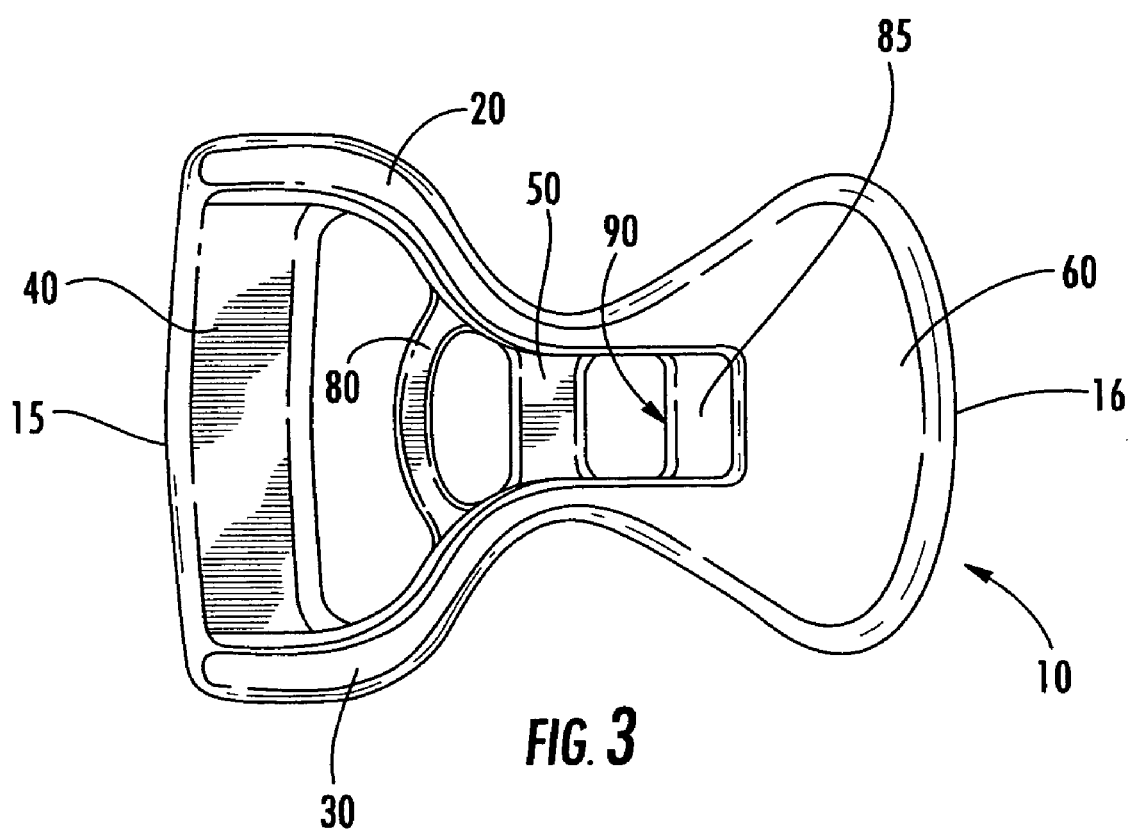
FIG. 3 is a plan view of the adjuster depicted in FIG. 1.

Turning to FIG. 3, a plan view of the adjuster depicted in FIG. 1 is provided. The first wall 20 and the second wall 30 are curved and are connected together by the first bar 40, the second bar 50, a keeper bar 80 and a rear wall 85. A trough 90 is provided in the rear wall 85. The keeper bar 80 helps direct the cord toward the trough 90 when tension is removed and then reapplied to a cord being positioned by the adjuster 10.

As depicted in FIG. 3, the distance between the first wall 20 and the second wall 30 about the second bar 50 is substantially similar to the width of the trough 90. Thus, when a cord is inserted into the adjuster 10 that has a diameter just slightly smaller than the dimension of the trough 90, the walls 20, 30 help keep the cord properly positioned. As will be seen below, however, a portion of the trough 90 could have a width less than the distance between the first wall 20 and the second wall 30 and also less than the diameter of the cord.

Figure 4:
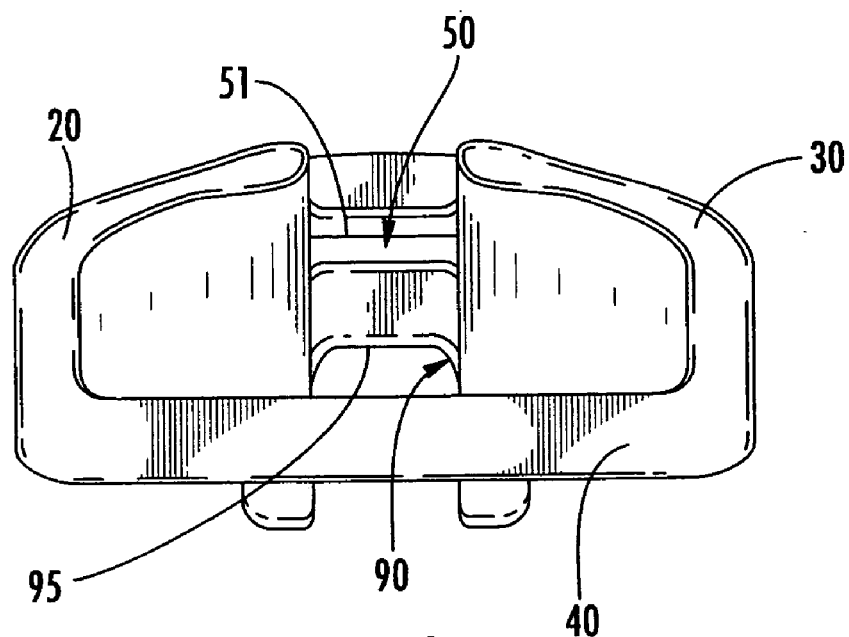
FIG. 4 is a front view of the adjuster depicted in FIG. 1.

Looking next at FIG. 4, a front view of the adjuster depicted in FIG. 1 is provided. As can be seen in FIG. 4, first bar 40 and second bar 50 join walls 20, 30 at two different elevations or horizontal planes. The upper edge 95 of trough 90 is at a third elevation or horizontal plane located between the first and second plane. The benefit of this arrangement will be discussed below.

The second bar 50 can include a surface 51 with friction enhancing properties. For example, the surface 51 of second bar 50 could include a number of angled surfaces (like a decagon, for instance) configured to aid in increasing the amount of frictional resistance to be exerted on the cord when installed. As not all areas of the second bar 50 come into contact with the cord while under tension, it may be desirable to configure the surface 51 so that only a portion of the surface 51 have friction enhancing properties. Other methods of enhancing the friction of the surface 51 such as the use of a rough surface or small projections are also possible, however the method of enhancing the coefficient of friction on surface 51 should be compliant with the type of cord used so as to avoid undesirable abrasion to, and premature wear of the cord during operation.

Figure 5:
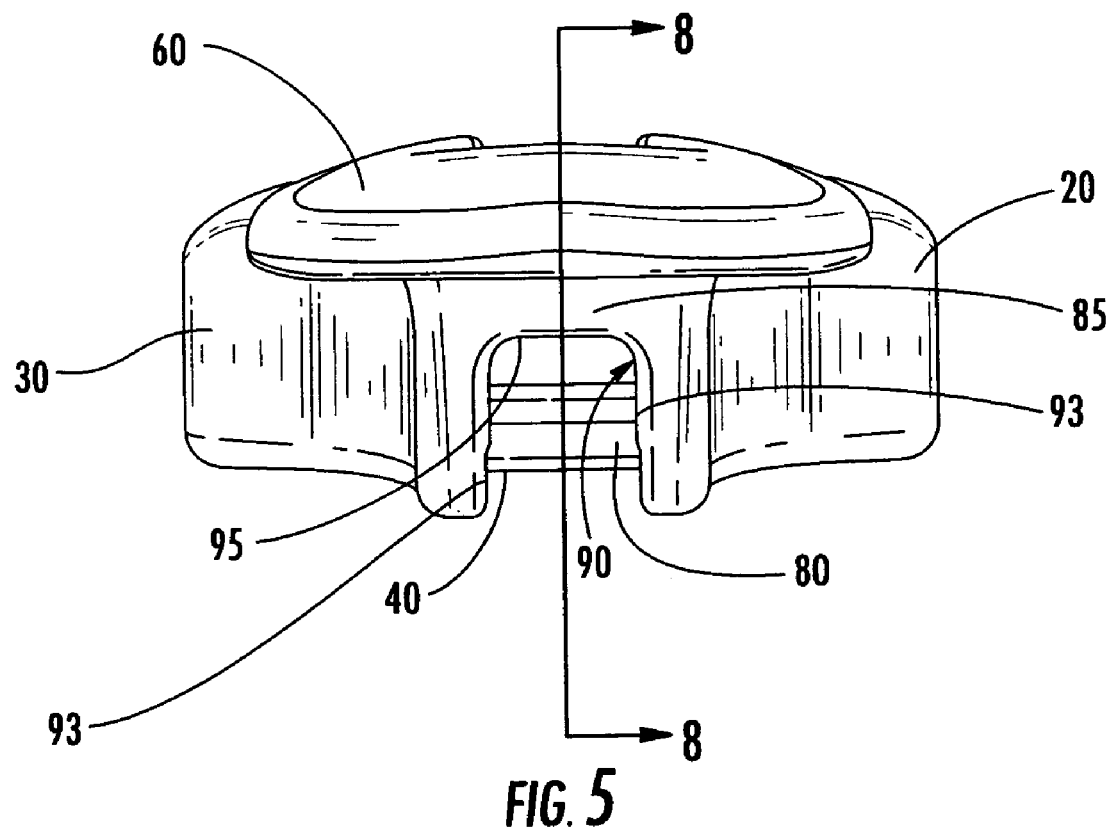
FIG. 5 is a rear view of the adjuster depicted in FIG. 1.

Turning to FIG. 5, a rear view of the adjuster depicted in FIG. 1 is illustrated. As can be appreciated, the rear wall 85 joins the first wall 20 and the second wall 30. The trough 90 is formed by two side edges 93 and the upper edge 95. One advantage of providing the trough 90 in the rear wall 85 is that the cord can form a stacked arrangement in the trough 90. Preferably, the dimension of the upper edge 95 is similar to or slightly larger than the diameter of the cord being positioned by the adjuster 10. It is also preferable that the side edges 93 have a slight angle. Having the side edges 93 at an angle aids in manufacturing and also can be used to direct the cord into a preferable stacking arrangement that will be discussed below.

Figure 6:
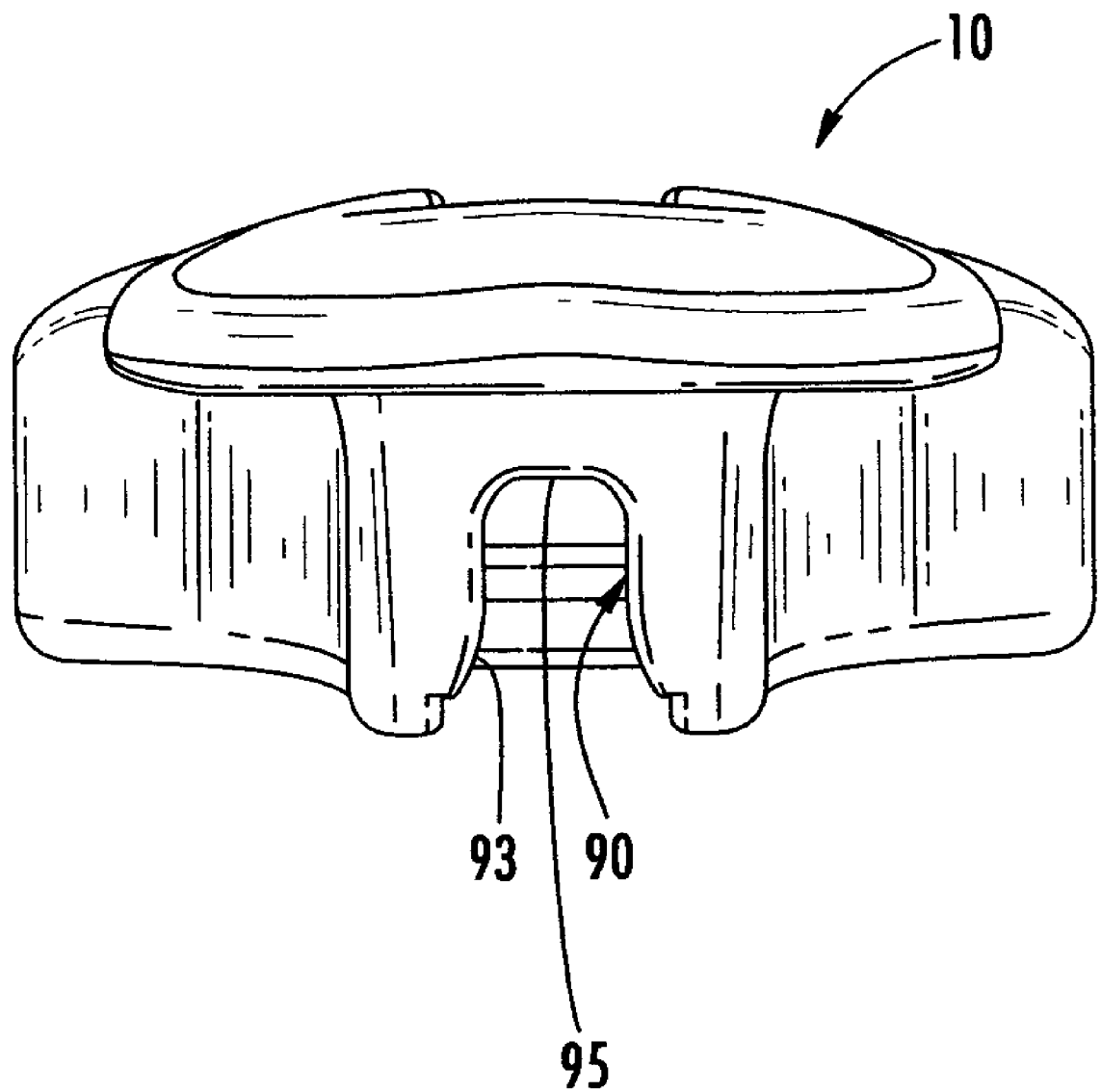
FIG. 6 is a rear view of alternative exemplary embodiment of an adjuster.

Looking next at FIG. 6, an alternative exemplary embodiment of the trough 90 is depicted. As compared to the trough 90 illustrated in FIG. 5, the trough 90 depicted in FIG. 6 has side edges 93 that are more angled and the upper edge 95 is shorter. In an embodiment, the length of upper edge 95 is less than the diameter of the cord being positioned by the adjuster 10. However, the open end of the trough 90 is somewhat wider, thus making it easy to direct the cord into the trough 90. Once in the trough 90, however, the reduced dimension of the upper edge 95 will tend to compress the cord so as to increase the frictional force on the cord during operation. Compared to the trough 90 illustrated in FIG. 5, the trough 90 depicted in FIG. 6 will beneficially increase the frictional resistance when the cord 110 is positioned and the second end 112 is under tension. The trough 90 ensures the desired stacking of the cord.

Figure 8:
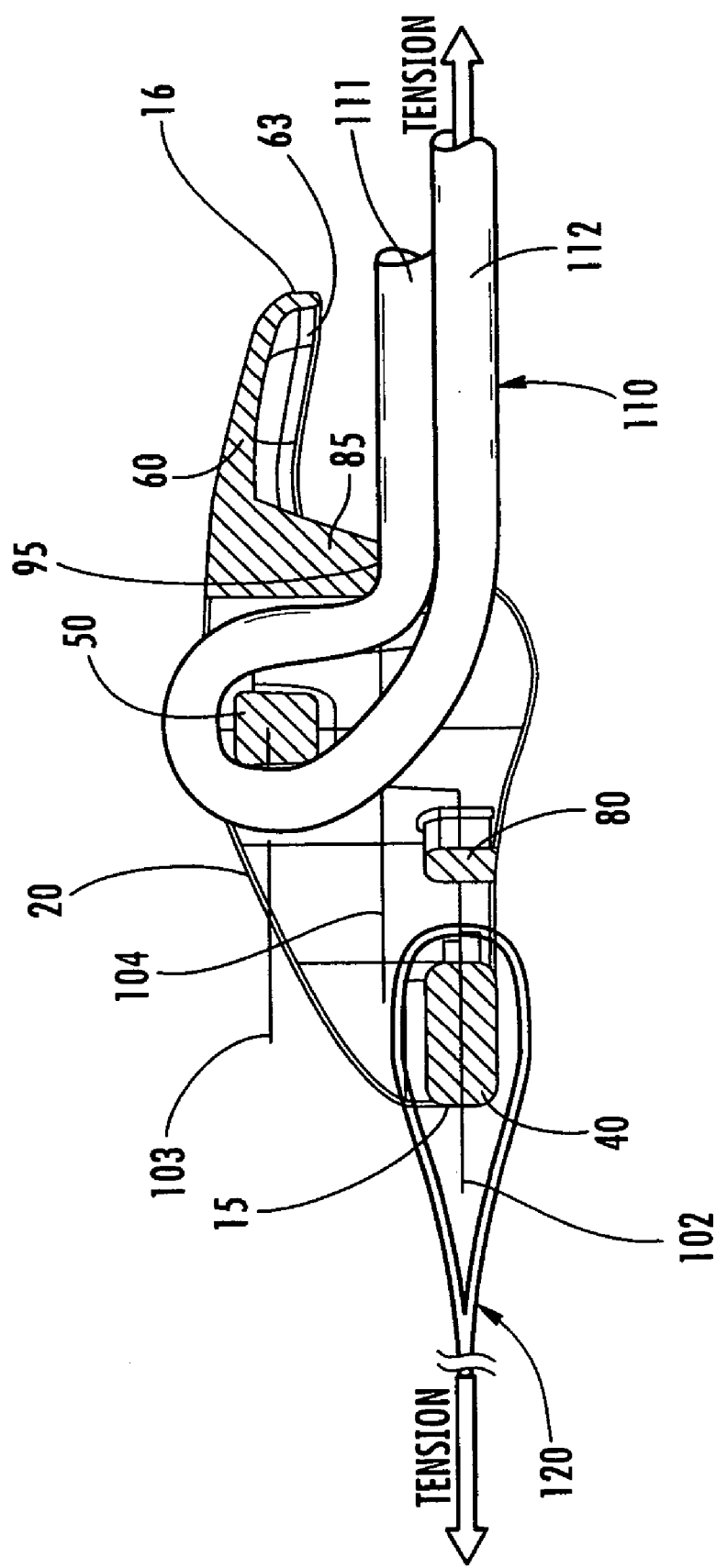
FIG. 8 is a cross-sectional view of an exemplary embodiment of an adjuster and a cord in a first position, taken along the line 8—8 in FIG. 5.

For example, a cross-sectional view of the adjuster 10 along the line 8—8 of FIG. 5 is illustrated in FIG. 8. A cord 110 has a first end 111 pressed up against the upper edge 95 by a second end 112 that is under tension. Thus, the trough 90 allows the creation of a stacked arrangement of cord.

Figure 7:
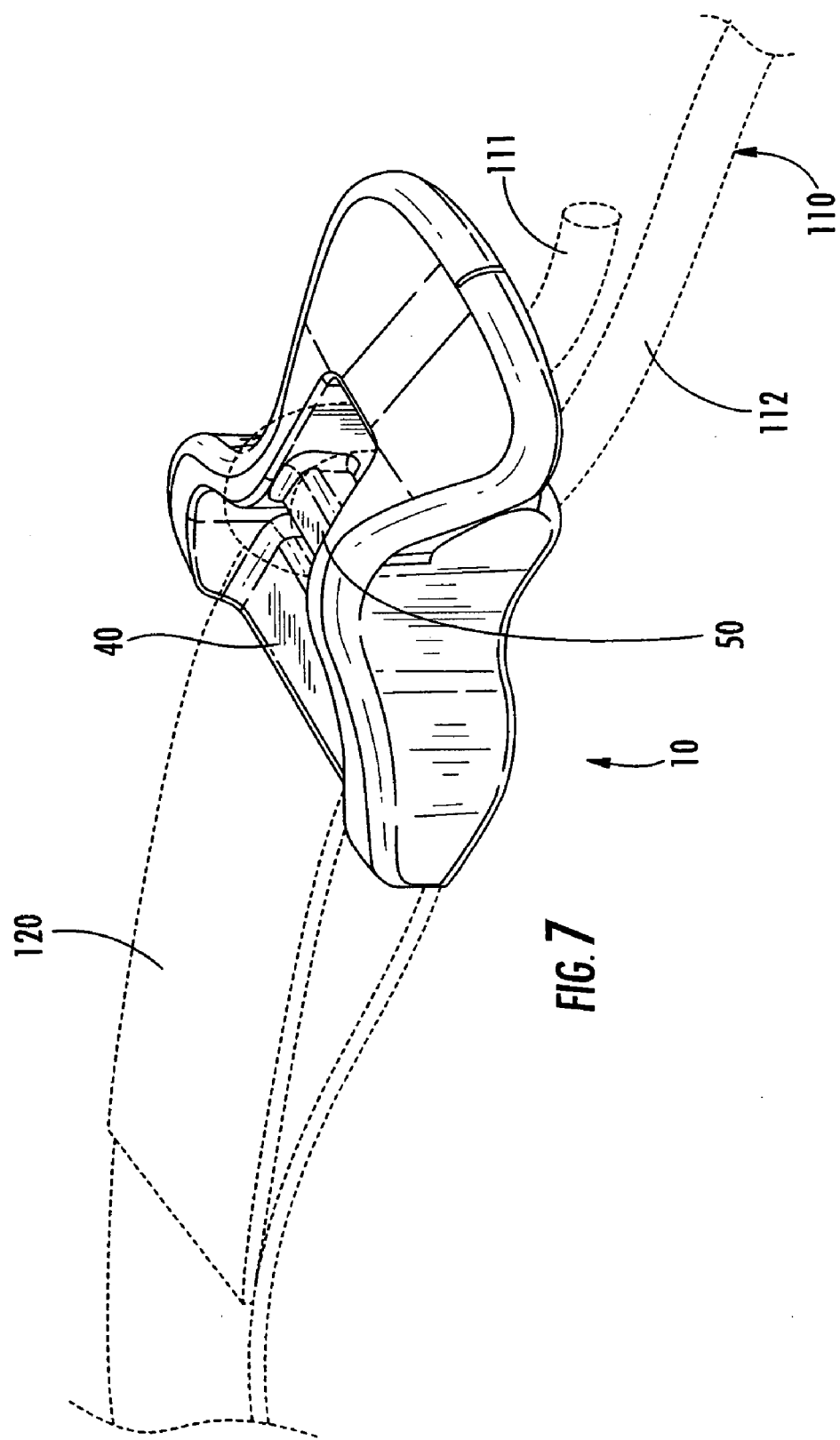
FIG. 7 is an isometric view of an exemplary embodiment of an adjuster and cord.

Turning back to FIG. 7, an isometric view of an exemplary embodiment of the adjuster 10 is illustrated. The cord 110 (shown in dotted lines) is mounted to the adjuster 10, the cord 110 having the first end 111 and the second end 112 extending from the adjuster. As can be appreciated, the cord 110 is looped over the second bar 50. Thus, the second bar 50 separates the cord 110 into the first end 111 and the second end 112. When tension is exerted on the second end 112, the resisting friction force prevents the cord 110 from being pulled through the adjuster 10, thus the cord 110 is held in position by the adjuster 10. A looped member 120, (depicted as a belt in dotted lines) can be mounted to the first bar 40 and aid in holding the adjuster 10 in place so as to ensure the tension applied to the second end 112 is maintained.

Turning now to FIG. 8, the cross-section of the adjuster 10 with the cord 110 inserted into the adjuster 10 is provided, the adjuster 10 being in a first position. As depicted, the looped member 120 is mounted to the first bar 40 so as to support the position of adjuster 10 under tension. In operation, the cord 110 is inserted into the adjuster, looped around the second bar 50 and the first end 111 is directed out of the adjuster 10 through the trough 90. As the second end 112 will be positioned below first the end 111 when passing through the trough, the two ends can be readily placed into a stacked arrangement. As previously mentioned, the distance between the first wall 20 and the second wall 30 approximate the second bar 50 is similar to the length of the upper edge 95. This spacing helps control the position of the first and second ends 111, 112 of the cord 110 so that the ends stack in a preferable arrangement. Thus, as depicted, the tortuous path includes the loop around the second bar 50 and the pinching against the upper edge 95.

When the adjuster 10 is in the first position, a first plane 102 can be drawn through the first bar 40, a second plane 103 can be drawn through the second bar 50 and a third plane 104 can be drawn through the upper edge 95 of trough 90. While the distance that separates the three planes is not crucial, it is desirable that the third plane 104 be situated between the first plane 102 and the second plane 103. This allows for beneficial application of forces and helps ensure the adjuster 10 is stable while under tension but does not require excessive force to move the adjuster 10 between the first position (where the cord is restrained) and a second position (where it is possible to reposition the cord).

Thus, as the first bar 40 and the second bar 50 are in different planes, when tension is applied to end 112 the tension will tend to cause the second end 16 to move downward so that the second bar 50 is aligned with the first bar 40. In other words, the offset distance of the second bar 50 in relation to the first bar 40 will create a moment that acts to rotate the adjuster 10 downward. However, the tension applied to the end 112 will also exert an upward force on the upper edge 95 that will create an equal but opposite moment and thus hold the adjuster 10 in the first position. In the process, the end 111 will be pinched between the second end 112 and the upper edge 95. This pinching creates significant normal forces that will cause substantial frictional resistance to movement of the cord 110. Thus, once the second end 112 is under tension, the resultant friction forces resisting movement of the cord 110 along the second bar 50 and along the upper edge 95 (along with the frictional force between the first end-111 and the second end 112) will be greater than the tension force applied to the second end 112 such that the adjuster 10 will hold the cord 110 in position.

While the adjuster 10 is designed to maintain the position of the cord 110 once the second end 112 is under tension, it may be desirable to adjust the tension and or the position of the cord 110. As can be appreciated, the tab 60 includes a lip 63. The lip 63 is useful in aiding a user in repositioning the cord 110 because it helps provide a better grip for the user attempting to move the tab 60.

Figure 9:
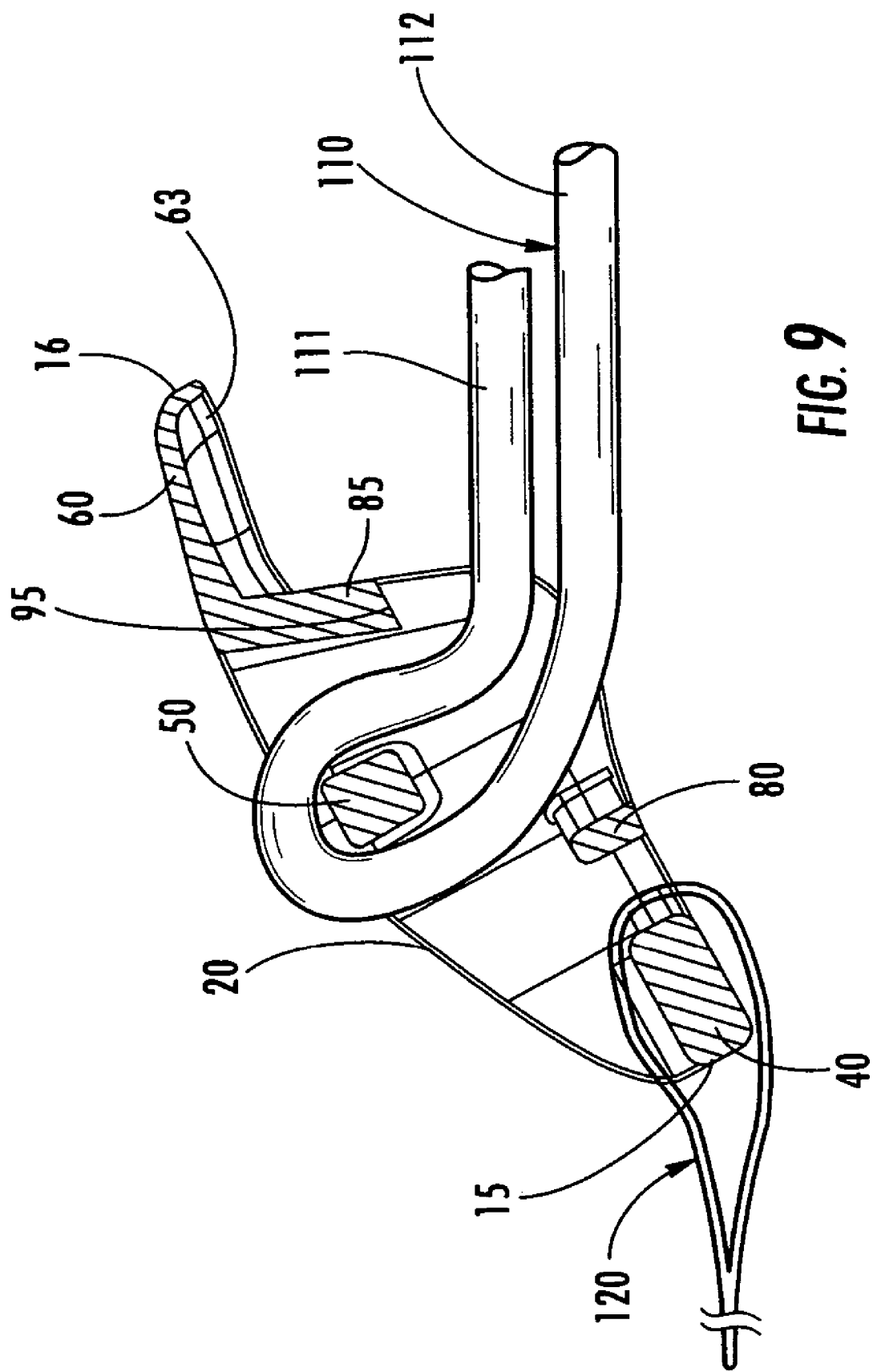
FIG. 9 is a cross-sectional view of the adjuster depicted in FIG. 8 in a second position.

Turning to FIG. 9, the adjuster 10 is positioned in a second position. To reach this position while the end 112 was under tension, a force is applied to the tab 60 so as to translate the adjuster 10 from the first position to the second position. In an embodiment, the translation can be rotational. Once in the second position, the frictional force resisting movement of the cord 110 is greatly diminished. This is due to the fact that the tortuous path is configured so that the cord 110 can be more readily moved once the orientation of the adjuster 10 is shifted toward the second position. Thus, tension applied to the second end 112 will accordingly cause the cord 110 to move around the bar 50 without much force being applied on the upper edge 95. Therefore, the lack of force pinching the first end 111 between the second end 112 and the upper edge 95 limits the amount of frictional force and therefore allows the cord 110 to be readily repositioned. In some configurations, once the second end 112 is under tension it may be necessary to move the adjuster 10 at least partially toward the second position in order to pull on the first end 11 so that additional lengths of the cord 110 can be pulled through the tortuous path of adjuster 10.

It should be noted that it is preferable to simplify the design and manufacturing of the adjuster 10. For example, as depicted it is possible to form the adjuster 10 out of a single molded plastic part. This allows for relatively rapid and inexpensive manufacture of the adjuster 10 in a known manner. If molded, the adjuster 10 can be made of a variety of plastics with a variety of additives, depending on the needed properties, as is known in the art. In an embodiment, the adjuster can be made of a material such as nylon 6/6.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An adjuster for positioning a cord, comprising:
   a holding means for supporting the adjuster in tension;
   a tortuous path means for restraining, in operation, a cord member, the tortuous path means including a top surface over which a surface of the cord member passes, and a bottom surface over which an opposite surface of the cord member passes;
   a stacking means for supporting a stacked arrangement during operation, the stacking means having an upper portion and a lower portion, such that the bottom surface of the tortuous path is positioned in a location between the upper and lower portions of the stacking means; and
   a translation means for moving the adjuster between a first position and a second position.

2. The adjuster as set forth in claim 1, wherein the holding means is configured to provide a fastening point for a looped member.

3. The adjuster as set forth in claim 1, further comprising a keeper bar configured to ensure the cord, during operation, is directed to the stacking means.

4. The adjuster as set forth in claim 3, wherein the adjuster is formed of a single piece.

5. An adjuster for a cord, the adjuster having a first end and a second end, the adjuster comprising:
   a first wall;
   a second wall;
   a first bar mounted between the first and second wall, the first bar located near the first end;
   a rear wall mounted between the first and second wall, the rear wall located between the first bar end the second end;
   a second bar mounted between the first and second wall, the second bar located between the first bar and the rear wall;
   a keeper bar mounted between the first and the second wall, the keeper bar located between the first bar and the second bar;
   a tab extending from the rear wall to the second end;
   a trough formed in the rear wall, the trough including an upper edge under which the cord passes; and
   wherein the adjuster can be positioned in a first position such that the first bar and the keeper bar are situated along a first plane and the second bar is situated along a second plane, and the upper edge of the trough is situated along a third plane, the third plane located between the first and second plane.

6. The adjuster as set forth in claim 5, wherein the distance between the first wall and the second wall is less at the rear wall than at the first bar.

7. The adjuster as set forth in claim 5, wherein the second bar includes a friction enhancing surface.

8. The adjuster as set forth in claim 7, wherein the friction enhancing surface includes a plurality of angled surfaces.

9. The adjuster as set forth in claim 8, wherein the trough is angled such that, in operation, the first end of the cord is more tightly restrained than the second end of the cord.

10. The adjuster as set forth in claim 5, wherein the adjuster has a top surface and a bottom surface, the bottom surface being curved; whereby the curvature of the bottom surface helps reduce potential abrasions caused by contact with the bottom surface.

11. The adjuster as set forth in claim 10, wherein the top surface is curved.

12. The adjuster as set forth in claim 5, wherein the adjuster is form of a single piece.

13. The adjuster as set fort in claim 12, wherein the adjuster is made of plastic via molding process.

14. A method of tensioning a cord, comprising the steps of:
    providing an adjuster;
    fastening a looped member to a first bar on a first end of the adjuster;
    inserting a cord through a tortuous path in the adjuster such that a first end of the cord and a second end of the cord extend from the tortuous path; and
    applying a tension to the second end of the cord such that the second end of the cord pinches the first end of the cord against an edge situated in a plane above the first bar and below the tortuous path.

15. The method of claim 14, the step of inserting the cord into the tortuous path further comprising the steps of:
    inserting the cord around a second bar, the second bar separating the cord into a first end and a second end, wherein the first end of the cord extends out through a trough in a rear wall of the adjuster; and
    forming a stacked arrangement of the first and second ends of the cord in the trough.

16. The method of claim 15, comprising the additional step of forming the adjuster of a single piece or material.

17. The method of claim 16, wherein the looped member is a belt.

18. The method of claim 17, further comprising the steps of:
    applying a force on a tab so as to move the adjuster from a first position to a second position;
    adjusting the position of the cord; and
    removing the force on the tab so as to allow the adjuster to move from the second position to the first position.

* * * * *